(12) United States Patent
Tsukamoto et al.

(10) Patent No.: US 11,556,079 B2
(45) Date of Patent: Jan. 17, 2023

(54) TONER CONTAINER INFORMATION ACQUIRING METHOD, TONER CONTAINER SORTING METHOD, TONER CONTAINER PULVERIZING METHOD, TONER CONTAINER PROCESSING METHOD, AND TONER CONTAINER MANUFACTURING METHOD

(71) Applicant: Konica Minolta, Inc., Tokyo (JP)

(72) Inventors: Toshio Tsukamoto, Hino (JP); Kosuke Nakamura, Hachioji (JP); Shinichi Hamaguchi, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/511,133

(22) Filed: Oct. 26, 2021

(65) Prior Publication Data

US 2022/0137529 A1 May 5, 2022

(30) Foreign Application Priority Data

Nov. 4, 2020 (JP) ............................. JP2020-184399

(51) Int. Cl.
*G03G 15/08* (2006.01)

(52) U.S. Cl.
CPC ....... *G03G 15/0848* (2013.01); *G03G 15/086* (2013.01); *G03G 15/0887* (2013.01); *G03G 15/0898* (2013.01); *G03G 2215/0855* (2013.01); *G03G 2215/0872* (2013.01)

(58) Field of Classification Search
CPC ............. G03G 15/0848; G03G 15/086; G03G 15/0887; G03G 15/0898; G03G 2215/0855; G03G 2215/0872
See application file for complete search history.

(56) References Cited

U.S. PATENT DOCUMENTS

| | | | |
|---|---|---|---|
| 2007/0036564 A1* | 2/2007 | Pytlik | G03G 15/0848 399/27 |
| 2014/0312886 A1* | 10/2014 | Hirota | G01N 27/72 324/228 |
| 2015/0016829 A1* | 1/2015 | Watanabe | G03G 15/0894 29/874 |

FOREIGN PATENT DOCUMENTS

| | | |
|---|---|---|
| EP | 1584988 A2 | 10/2005 |
| JP | H05-322811 A | 12/1993 |
| JP | H07-244427 A | 9/1995 |
| JP | H10-83112 A | 3/1998 |
| JP | 2004-028707 A | 1/2004 |

OTHER PUBLICATIONS

EPO, Extended European Search Report for the corresponding European application No. 21204945.6, dated Mar. 15, 2022.

* cited by examiner

Primary Examiner — Joseph S Wong
(74) Attorney, Agent, or Firm — Lucas & Mercanti, LLP

(57) ABSTRACT

A toner container information acquiring method includes: measuring a toner amount contained in a resin forming a toner container; and acquiring information regarding mechanical strength of the toner container based on the measured toner amount.

17 Claims, 7 Drawing Sheets

TONER CONTAINER INFORMATION ACQUIRING METHOD, TONER CONTAINER SORTING METHOD, TONER CONTAINER PULVERIZING METHOD, TONER CONTAINER PROCESSING METHOD, AND TONER CONTAINER MANUFACTURING METHOD

The entire disclosure of Japanese patent Application No. 2020-184399, filed on Nov. 4, 2020, is incorporated herein by reference in its entirety.

BACKGROUND

Technological Field

The present invention relates to a toner container information acquiring method, a toner container sorting method, a toner container pulverizing method, a toner container processing method, and a toner container manufacturing method.

Description of the Related Art

Conventionally, it is known that a used toner container can be collected and reused (recycled) as a raw material. To the collected used toner container, a small amount of toner that has not been discharged or toner that has not been removed adheres. When this container is pulverized, melted, and processed into a container again to be used, problems occur such as damage originating from the toner contained in the toner container and decrease in impact strength of the toner container. As described above, the problem of deterioration of the toner container is particularly remarkable when the recycling frequency is increased. Therefore, it is important to more accurately estimate a deterioration state of the toner container, to sort the toner container in accordance with the estimated state, and to suppress deterioration of the toner container.

There are various methods as means for suppressing deterioration of a toner container.

For example, JP H7-244427 A describes a toner vessel in which toner and a raw material resin compatible with a binder resin of the toner are mixed and plastic molded. According to JP H7-244427 A, it is described that, by setting an Izod impact strength of the raw material resin to 8.0 to 13.0 (kgf·cm/cm$^2$) and mixing with toner of 30 wt % or less, the Izod impact strength can be adjusted to 6.0 to 10.0 (kgf·cm/cm$^2$), and a container to which the toner adheres can be recycled.

In addition, there are various methods as means for estimating a degree of deterioration of a resin container due to recycling.

JP 2004-28707 A describes a method for discriminating a resin material recycling frequency. According to JP 2004-28707 A, it is described that each of resin materials having different recycling frequencies have been irradiated with measurement light, and data has been prepared in which a first color tone value obtained from reflected light from the resin material and a recycling frequency are associated with each other. It is described that, as a result, it is possible to obtain a recycling frequency of the resin material in which a difference between the first color tone value and a second color tone value obtained from a target resin material is within a predetermined range.

JP H5-322811 A describes a method for sorting remolding of crystalline thermoplastic. According to JP H5-322811 A, a degree of deterioration of a thermoplastic crystalline polymer can be evaluated by a melting heat quantity measured using a thermal analyzing instrument.

As disclosed in JP H7-244427 A, a method for suppressing deterioration of a toner container is known.

However, in the method of JP H7-244427 A, a degree of deterioration when an existing toner container is recycled is unknown.

Further, as disclosed in JP 2004-28707 A and JP H5-322811 A, a method of estimating a degree of deterioration of a resin container due to recycling is known.

However, sorting methods disclosed in JP 2004-28707 A and JP H5-322811 A take time and effort, and simple estimation is not possible.

SUMMARY

The present invention has been made in view of the above circumstances, and an object is to provide a toner container information acquiring method capable of estimating a degree of deterioration of a used toner container, a toner container sorting method of sorting toner containers in accordance with the estimated degree of deterioration, a toner container pulverizing method for suppressing damage due to deterioration of a toner container, a toner container processing method, and a toner container manufacturing method.

To achieve the abovementioned object, according to an aspect of the present invention, a toner container information acquiring method reflecting one aspect of the present invention comprises: measuring a toner amount contained in a resin forming a toner container, and acquiring information regarding mechanical strength of the toner container based on the measured toner amount.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. Note that, in the present specification, a "recycling frequency" refers to the number of times a toner container or another resin is recycled. The "another resin" will be described later.

1. Toner Container Information Acquiring Method

Figure 1:
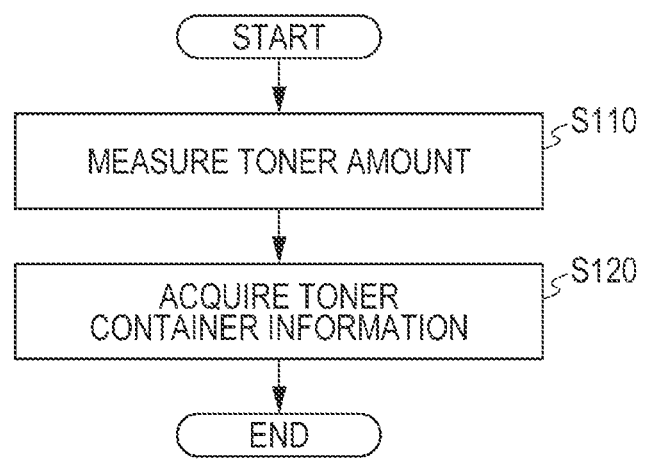
FIG. 1 is a flowchart of a toner container information acquiring method according to an embodiment of the present invention.

FIG. 1 is a flowchart of a toner container information acquiring method according to an embodiment of the present invention.

As illustrated in FIG. 1, the toner container information acquiring method according to the embodiment of the present invention includes: a step of measuring a toner amount contained in a resin forming a toner container, and a step of acquiring information regarding mechanical strength of the toner container on the basis of the measured toner amount.

1-1. Step of Measuring Amount of Toner (Step S110)

In this step, an amount of toner (hereinafter, referred to as container-contained toner) contained in a resin forming a toner container is measured.

In this step, a toner container from which toner filled in the container has been removed as much as possible is used. Specific examples include a toner container in a state where a toner replacement sign is indicated in an image forming apparatus, a toner container in which toner filled in the container has been suctioned and removed, and the like.

As the toner container in the present invention, a resin-made container is used. The resin contained in the toner container is not particularly limited as long as an effect of the present invention is exhibited, and examples include a polyester resin, a polyolefin resin, a polystyrene resin, a polyvinyl chloride resin, an acrylic acid, a methacrylic acid, and an ester of these, an acrylic resin or a methacrylic resin obtained by polymerization of acrylonitrile or the like, a synthetic resin such as a polyvinyl resin, a polycarbonate resin, an ABS resin, and a polyacetal resin, and the like. These may be contained singly, or two or more kinds thereof may be contained. From the viewpoint of less deterioration due to moisture and excellent recyclability, a polyolefin resin and a polystyrene resin are preferable.

The toner container used in the present invention is not particularly limited, and examples of the toner container include a toner cartridge, a toner bottle, and the like.

A shape of the toner cartridge is not particularly limited, and examples include a cylindrical container having an opening and a bottom and provided with a slide shutter and a toner discharge port on the bottom side, and the like.

A shape of the toner bottle is not particularly limited, but is generally an integrated shape formed by blow molding a resin. For example, examples of the toner bottle include, for example, a cylindrical container having a cylindrical shape as a whole and including: a main body that stores toner, and a mouth portion having a toner discharge function, a function of covering with a cap to seal the toner, a function of positioning with an image forming apparatus main body, and the like.

An amount of toner measured in this step includes amounts of toner base particles, an external additive, a carrier, and the like. Therefore, in this step, an amount of toner base particles may be measured, an amount of an external additive having fallen off from the toner base particles may be measured, an amount of a carrier may be measured, or an amount of the entire toner containing these may be measured.

The toner base particles contain a binder resin, and a colorant, a mold-releasing agent, a charge control agent, and an external additive that are optionally added.

The binder resin may be a crystalline resin, an amorphous resin, or a combination of these.

As the crystalline resin, a known crystalline resin can be used. Specific examples include a crystalline polyester resin, a crystalline polyurethane resin, a crystalline polyurea resin, a crystalline polyamide resin, and a crystalline polyether resin. One kind of crystalline resin may be used alone, or two or more kinds may be used in combination.

The amorphous resin is not particularly limited, and examples include a homopolymer or a copolymer of styrenes such as styrene, parachlorostyrene, and α-methylstyrene, a polyester resin, and the like.

The colorant may be a dye or a pigment. Toner particles constituting color toner suffice to contain a colorant such as yellow, magenta, cyan, or black according to a color tone to be represented by the color toner.

Examples of the yellow colorant include: yellow dyes including C.I. Solvent Yellow 19, 44, 77, 79, 81, 82, 93, 98, 103, 104, 112, 162, and the like; and yellow pigments including C.I. Pigment Yellow 14, 17, 74, 93, 94, 138, 155, 180, 185, and the like.

Examples of the magenta colorant include: magenta dyes including C.I. Solvent Red 1, 49, 52, 58, 63, 111, 122, and the like; and magenta pigments such as C.I. Pigment Red 5, 48:1, 53:1, 57:1, 122, 139, 144, 149, 166, 177, 178, 222, and the like.

Examples of the cyan colorant include: cyan dyes such as C.I. Solvent Blue 25, 36, 60, 70, 93, 95, and the like; and cyan pigments such as C.I. Pigment Blue 1, 7, 15, 15:3, 60, 62, 66, 76, and the like.

Examples of the black colorant include: carbon black including channel black, furnace black, acetylene black, thermal black, lamp black, and the like; a magnetic material including ferrite, magnetite, and the like; an iron-titanium composite oxide; and the like.

The mold-releasing agent may simply be a known wax that can be contained as a mold-releasing agent in the toner particles.

Examples of the wax include olefin waxes including polyethylene, low molecular weight polypropylene, and oxidation-type low molecular weight polypropylene, paraffin, a synthetic ester wax, and the like. Among them, the synthetic ester wax is preferable because of a constant melting point and a low viscosity, and behenyl behenate, glycerin tribehenate, pentaerythritol tetrabehenate, and the like are more preferable. One type of these waxes may be contained alone in the toner particles or plurality of types may be contained in combination.

The charge control agent may simply be a known colorless compound that can apply a positive or negative charge to the toner particles by frictional electrification and can be contained as a charge control agent in the toner particles. One type of the charge control agent may be contained alone in the toner particles or a plurality of types may be contained in combination.

The external additive may be a known fluidizing agent, cleaning agent, and the like that are added as a post-treatment agent to a surface of the toner particles to enhance flowability, chargeability, and cleanability of color toner and transparent toner.

Examples of the external additive include: inorganic oxide particles including silica particles, alumina particles, titanium oxide particles, and the like; inorganic stearic acid compound particles including aluminum stearate particles, zinc stearate particles, and the like; inorganic titanate compound particles such as strontium titanate particles and zinc titanate particles; and the like. Note that, these external additives may be surface-treated with a silane coupling agent, a titanium coupling agent, a higher fatty acid, silicone oil, or the like in order to enhance heat-resistant storage property, environmental stability, and the like. One type of the external additive may be added alone to the toner particles, or a plurality of types may be added in combination.

The carrier is mixed with the toner particles to constitute a two-component magnetic toner. The carrier may simply be a known magnetic particle that may be contained in the toner.

Examples of the magnetic particles include particles including magnetic materials such as iron, steel, nickel, cobalt, ferrite, and magnetite, and an alloy of these with aluminum, lead, and the like. The carrier may be a coated carrier in which a surface of particles made of the magnetic material is coated with a resin or the like, or may be a resin dispersion type carrier in which the magnetic material is dispersed in a binder resin. Examples of the coating resin include an olefin resin, a styrene resin, a styrene-acrylic resin, a silicone resin, a polyester resin, a fluororesin, and the like. Examples of the binder resin include an acrylic resin, a styrene-acrylic resin, a polyester resin, a fluororesin, a phenol resin, and the like.

In particular, these kinds of toner may firmly adhere to an inner wall surface of the toner container. Then, the inventors have found that an amount of the container-contained toner increases every time the toner container is recycled. This is considered to be because the toner is contained in the resin forming the toner container by melting and re-molding the toner container while the toner adheres to the toner container.

Further, the inventors have found that strength of the toner container is low when the amount of the container-contained toner is large. This is considered to be because when the amount of the container-contained toner is large, this toner becomes a foreign substance and lowers the strength of the toner container. On the basis of these findings, the inventors have found that a recycled amount of the toner container and strength of the toner container can be estimated from the amount of the container-contained toner.

A method of measuring the amount of the container-contained toner is not particularly limited, and examples include an observation measurement method, an elemental analysis method, and the like.

The observation measurement methods include a method of observing a cross section of a fragment of a toner container to measure an amount of container-contained toner, a method of observing a surface of a toner container to measure an amount of container-contained toner (surface observation measurement method), and the like.

The method of observing a cross section of a fragment of a toner container and measuring is, specifically, a method of observing the cross section by using an optical microscope or the like, performing image processing on an observation image, and measuring an amount of container-contained toner.

Specifically, in the surface observation measurement method, a surface of a resin forming a toner container is observed using an optical microscope or the like, an observation image is subjected to image processing, and an amount of toner is measured.

Note that the method of obtaining the observation image may be performed using a CCD camera or the like including a high magnification lens. Further, in a case where a difference in color tone between a portion containing the toner and a portion not containing the toner is clearly known, the entire image of the toner container may be captured, and a toner amount may be calculated from an area ratio of the portion containing the toner in the image processing. Further, a toner content level may be determined on the basis of a ratio of a toner content area to a surface area of the toner container.

The elemental analysis method is a method of measuring an amount of toner by analyzing an amount of a specific element containing the container-contained toner. Specifically, inorganic particles included in an external additive contained in the toner are analyzed. A method of the elemental analysis is not particularly limited, but a fluorescent X-ray analysis method is preferable from the viewpoint of simplicity of measurement operation and rapidity of measurement results.

Note that, in the present invention, measurement may be performed by observation from the outside of the toner container, or measurement may be performed by observation from the inside. In addition, the amount of toner obtained by the measurement may be a value as an absolute number or a value of a content rate with respect to the toner container.

1-2. Step of Acquiring Information Regarding Mechanical Strength of Toner Container (Step S120)

In this step, information regarding deterioration of mechanical strength of the toner container described above is acquired on the basis of the amount of the container-contained toner measured in the step of measuring the amount of toner.

Since the amount of the container-contained toner increases and the mechanical strength decreases every time the recycling frequency of the toner container is increased, it can be seen that the mechanical strength decreases as the amount of toner measured in the step of measuring the amount of toner increases.

Specific example of the method of acquiring information regarding the mechanical strength of the toner container includes a method of estimating a recycling frequency, and the like. As a result, information regarding the mechanical strength of the toner container can be acquired from the estimated recycling frequency.

The method of estimating the recycling frequency is not particularly limited as long as it is performed on the basis of the measured amount of the toner. However, from the viewpoint of enabling simple performance, it is preferable to adopt a method of estimating by using a relation view between the recycling frequency and the amount of the container-contained toner. Specifically, a relation view such as a graph representing a correspondence with an amount of the container-contained toner at a predetermined recycling frequency is created in advance, and a recycling frequency is estimated from a toner amount measured in a target toner container by using the relation view.

Specific Example

<<Creation of Relation View Between Recycling Frequency and Amount of Toner Particles>>
<Recycling of Toner Container>

After filled toner is suctioned and removed by a suction machine (CV-95H2, manufactured by Hitachi Industrial Equipment Systems Co. Ltd.) from a toner container (polyethylene resin container) filled with toner, the toner container was pulverized into flakes by a pulverizer (150-35, manufactured by Rapid Granulator AB). The obtained flakes were melt-kneaded with a twin-screw kneader (KTX 30, manufactured by Kobe Steel, Ltd), extruded, and processed into pellets to obtain a molding material. Using the obtained molding material, a polyethylene resin container was blow-molded using an extruder (MSD-70E, manufactured by Tahara Machinery Ltd.), and the molded toner container was filled with toner. At this time, a recycling frequency of the toner container was set to 1, and the operation was repeated until the recycling frequency reached 5.

<Measurement of Container-Contained Toner Amount>

Figure 2:
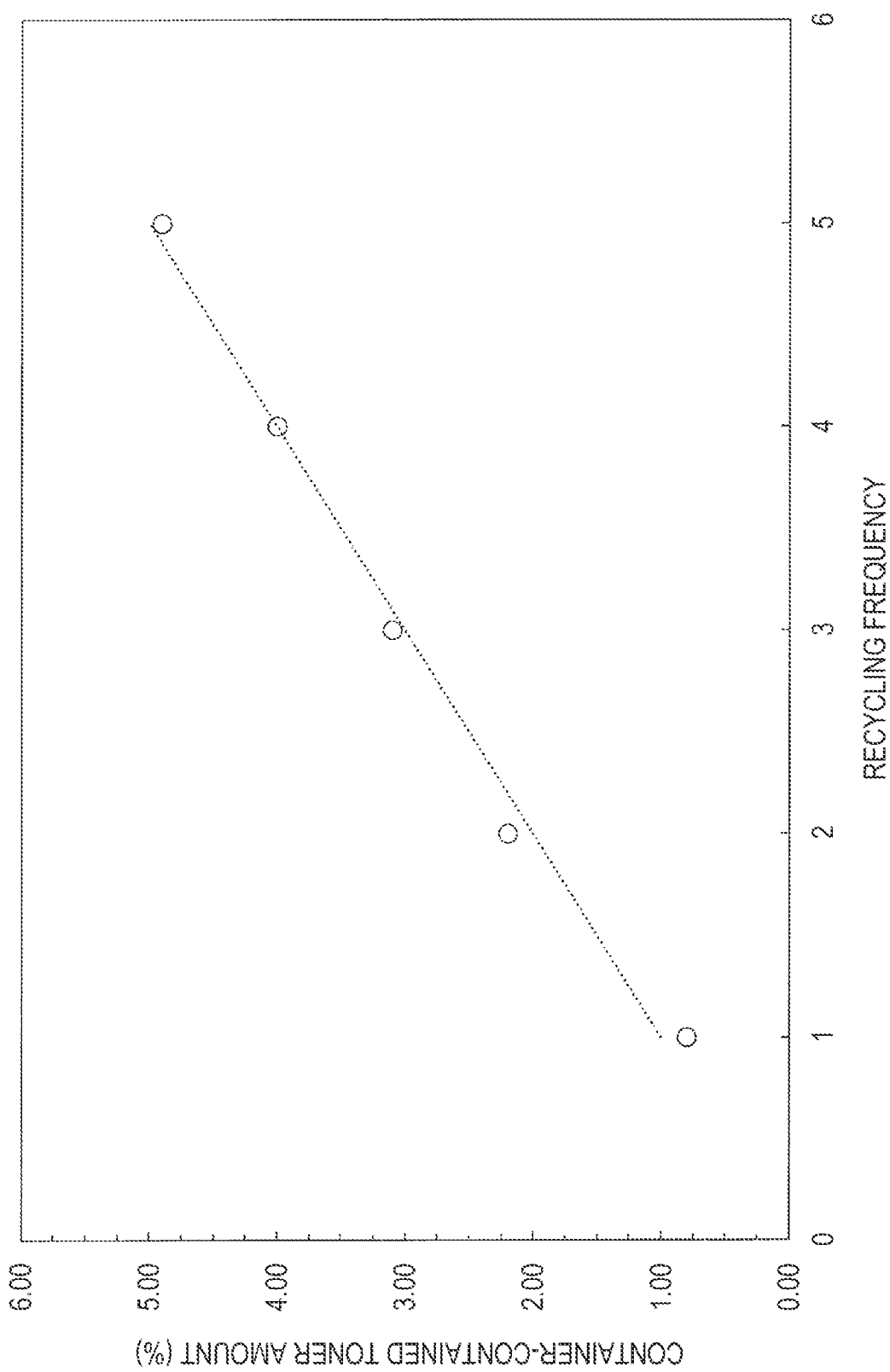
FIG. 2 is a relation view between a recycling frequency and a container-contained toner amount, in a specific example of a toner container information acquiring method according to an embodiment of the present invention.

The toner was suctioned and removed from the toner container in which the recycling frequency was 1 with the suction machine, then an outer surface of the toner container was observed with an optical microscope (VK-X250, manufactured by KEYENCE CORPORATION), and an observation image was captured. The captured image was binarized using LUZEX (manufactured by NIRECO CORPORATION), and an amount of the toner contained in the container was measured from an area ratio of a portion containing the toner and a portion not containing the toner. For the toner containers in which the recycling frequency is 2 to 5, an amount of toner was similarly measured, and a relationship between the recycling frequency and the amount of container-contained toner particles was shown in Table 1. On the basis of Table 1, a calibration curve illustrated in FIG. 2 was created.

TABLE 1

|  | Recycling frequency | | | | |
| --- | --- | --- | --- | --- | --- |
|  | 1 | 2 | 3 | 4 | 5 |
| Toner adhesion amount (%) | 0.80 | 2.20 | 3.10 | 4.00 | 4.90 |

As shown in Table 1, since there is a correlation between the recycling frequency of the toner container and the amount of the container-contained toner, the recycling frequency can be estimated from the amount of the container-contained toner for the target toner container. Note that the recycling frequency estimated by the calibration curve may not be an integer.

Figure 3:
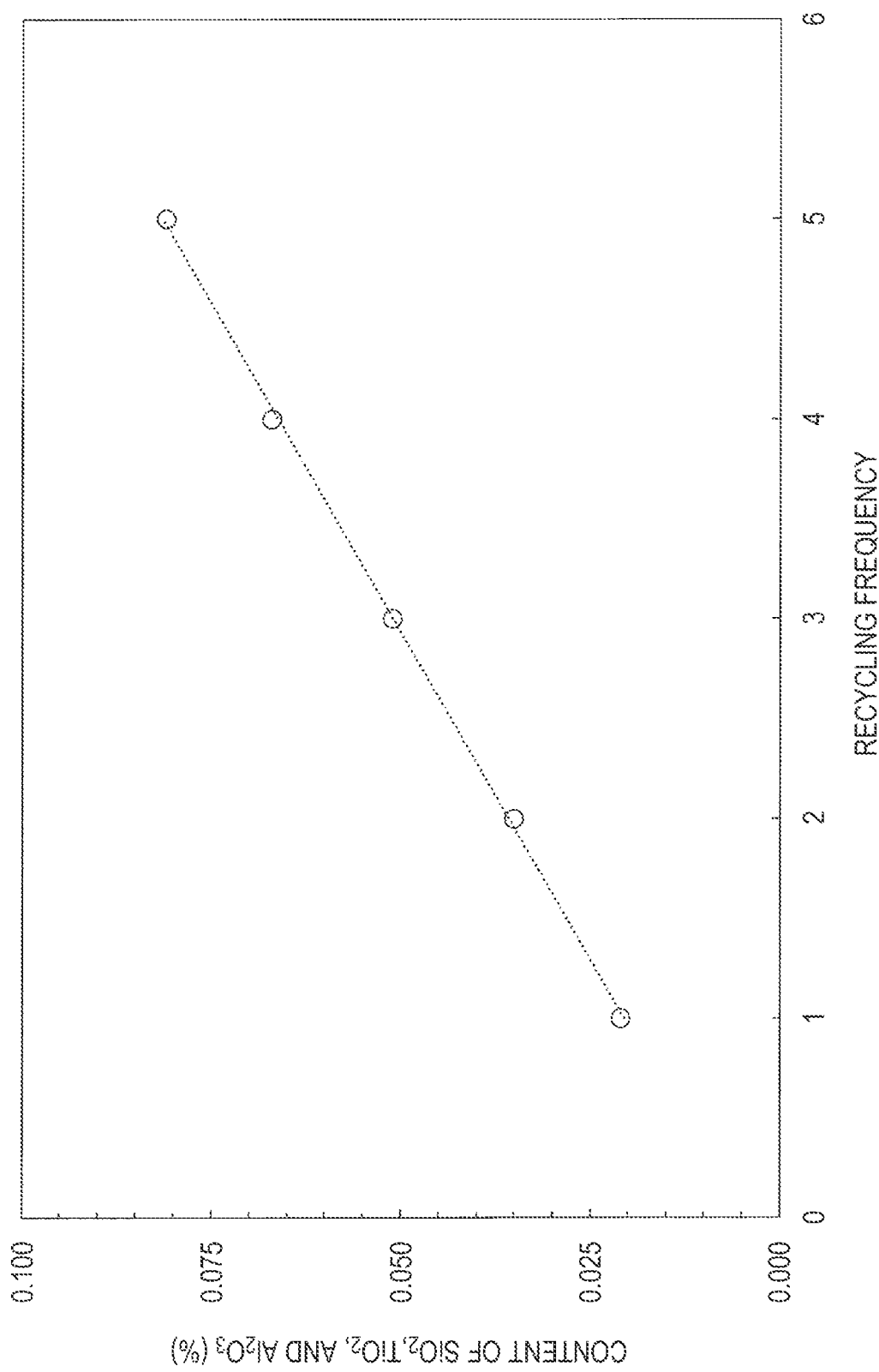
FIG. 3 is a relation view between a recycling frequency and a total amount of silica particles, titanium oxide particles, and alumina particles contained in a resin forming a toner container, in a specific example of a toner container information acquiring method according to an embodiment of the present invention.

Further, after the toner is suctioned and removed from the toner container in which the recycling frequency is 1 by the suction machine, a total amount of silica particles, titanium oxide particles, and alumina particles contained in the resin forming the toner container was measured using a fluorescent X-ray analyzer (DELTA, manufactured by Olympus Corporation), with silicon (Si), titanium (Ti), and aluminum (Al) as a target of elemental analysis. The toner containers in which the recycling frequency was 2 to 5 were also measured in a similar manner, and a relationship between the recycling frequency and the total amount of silica ($SiO_2$) particles, titanium oxide ($TiO_2$) particles, and alumina ($Al_2O_3$) particles was shown in Table 2. On the basis of Table 2, a calibration curve illustrated in FIG. 3 was created.

TABLE 2

|  | Recycling frequency | | | | |
| --- | --- | --- | --- | --- | --- |
|  | 1 | 2 | 3 | 4 | 5 |
| $SiO_2$, $TiO_2$, $Al_2O_3$ (%) | 0.021 | 0.0.35 | 0.051 | 0.067 | 0.081 |

As shown in Table 2, since there is a correlation between the recycling frequency of the toner container and the total amount of silica particles, titanium oxide particles, and alumina particles contained in the resin forming the toner container, the recycling frequency can be estimated from the amount of the particles contained in the resin forming the target toner container.

The measurement result by the fluorescent X-ray analysis as described above can be applied to estimation of the recycling frequency even when toner base particles of the container-contained toner are melted in the process of recycling. As described above, since the toner contains an external additive including inorganic particles such as silica particles, even when the toner base particles are melted, the elemental analysis may simply be performed on the inorganic particles contained in the external additive. Note that the recycling frequency estimated by the calibration curve may not be an integer.

Note that the scope of the present invention is not interpreted as being limited by the description of the specific examples described above.

2. Toner Container Sorting Method

Figure 4:
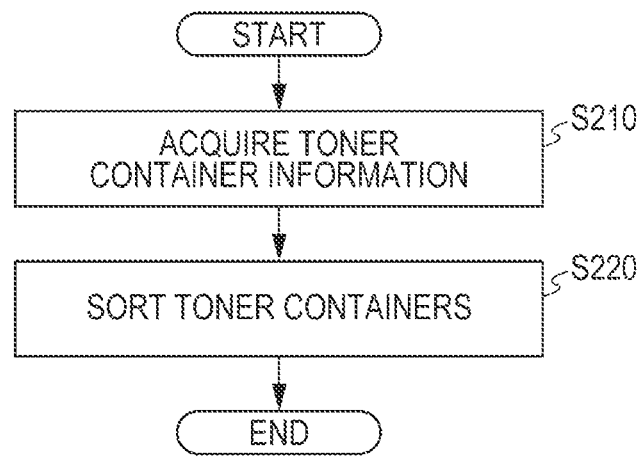
FIG. 4 is a flowchart of a toner container sorting method according to an embodiment of the present invention.

FIG. 4 is a flowchart of a toner container sorting method according to an embodiment of the present invention.

As illustrated in FIG. 4, the toner container sorting method according to the embodiment of the present invention includes: a step of acquiring information regarding mechanical strength of a toner container by the toner container information acquiring method; and sorting the toner container in accordance with the acquired information regarding the toner container.

2-1. Step of Acquiring Information Regarding Toner Container (Step S210)

In this step, information regarding the toner container is acquired by the toner container information acquiring method. Since a specific method is similar to the toner container information acquiring method, a detailed description thereof will be omitted.

2-2. Step of Sorting Toner Containers (Step S220)

In this step, toner containers are sorted in accordance with the toner container information acquired in the step of acquiring the toner container information.

Examples of a method of sorting toner containers include a method of sorting toner containers into toner containers having strength of a similar degree in accordance with the acquired toner container information, a method of selecting a toner container to be recycled and a toner container not to be recycled, a method of labeling a toner container with the recycling frequency, and the like.

In the method of sorting toner containers and the method of labeling, sorting or labeling is performed so that the toner containers can be pulverized, processed, and manufactured in accordance with the estimated recycling frequencies. For example, by sorting toner containers in accordance with a degree of decrease in strength (the recycling frequency), an amount of another resin (a virgin material) to be added in a subsequent step (step S411) for each sorted toner container can be determined at this stage.

In the method of selecting a toner container to be recycled and a toner container not to be recycled, selection is made based on whether or not to recycle the target toner container in accordance with the toner container information acquired in the step of acquiring the toner container information. From the viewpoint of improving accuracy of the selection, it is preferable to perform selection according to the recycling frequency estimated by the method of estimating the recycling frequency. Specifically, the selection is made such that a toner container in which the recycling frequency is equal to or less than a predetermined frequency is used for recycling since predetermined strength is maintained, and a toner container in which the recycling frequency is equal to or more than a predetermined frequency not to be used for recycling because the strength is reduced.

More specifically, it is preferable not to use for recycling when the amount of the container-contained toner is 7% or more in the step of estimating the state of the toner container, it is more preferable not to use for recycling when the amount of the container-contained toner is 6% or more, and it is even more preferable not to use for recycling when the amount of the container-contained toner is 5.5% or more.

3. Toner Container Pulverizing Method

Figure 5:
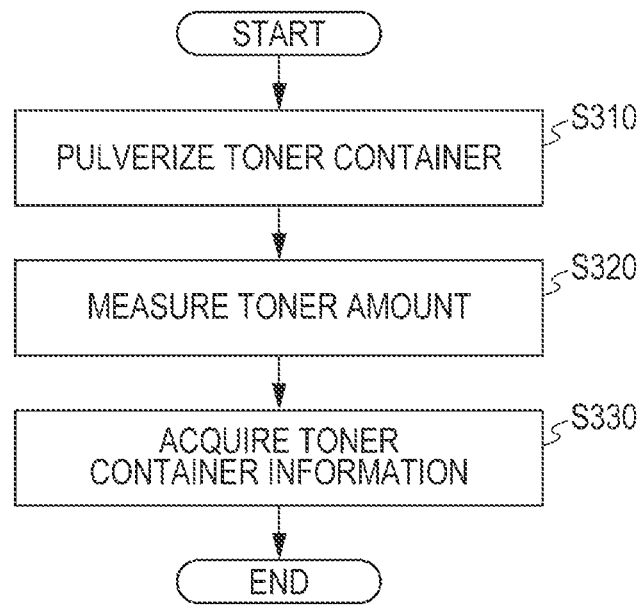
FIG. 5 is a flowchart of a toner container pulverizing method according to an embodiment of the present invention.

FIG. 5 is a flowchart of a toner container pulverizing method according to an embodiment of the present invention.

As illustrated in FIG. 5, the toner container pulverizing method according to the embodiment of the present invention includes a step of pulverizing a toner container sorted by the toner container sorting method (step S310).

Note that, in the toner container pulverizing method according to the present invention, the toner container may be pulverized or may simply be crushed. The toner container to be pulverized may be a toner container for which information regarding mechanical strength has been acquired, or may be a toner container for which information regarding mechanical strength has not been acquired. In pulverizing a toner container for which information regarding mechanical strength has not been acquired, as illustrated in FIG. 5, in the present embodiment, a step (step S320) of measuring an amount of the toner, and a step (S330) of acquiring information regarding the mechanical strength of the toner container are included after the step of pulverizing the toner.

3-1. Step of Pulverizing Toner Containers (Step S310)

This step is a step of pulverizing the toner container sorted by the toner container sorting method.

The toner container pulverizing method is not particularly limited, and examples include methods using a hammer type pulverizer, a uniaxial pulverizer, and a biaxial pulverizer.

3-2. Step of Measuring Amount of Toner (Step S320)

This step is performed on a toner container for which a toner amount has not been measured. When a toner container is crushed in the step of pulverizing the toner container, an amount of container-contained toner may be measured for the toner container after crushing. Since a method of measuring the amount of toner in the toner container is similar to the toner container information acquiring method, detailed description thereof will be omitted.

3-3. Step of Acquiring Information Regarding Mechanical Strength of Toner Container (Step S330)

This step is performed on a toner container for which a toner amount has not been measured. When a toner container is crushed in the step of pulverizing the toner container, an amount of container-contained toner may be measured for the toner container after the crushing, and the toner container information may be acquired on the basis of the measured amount of the toner. Since a method of acquiring the information regarding the toner container is similar to the toner container information acquiring method, detailed description thereof will be omitted.

4. Toner Container Processing Method

Figure 6:
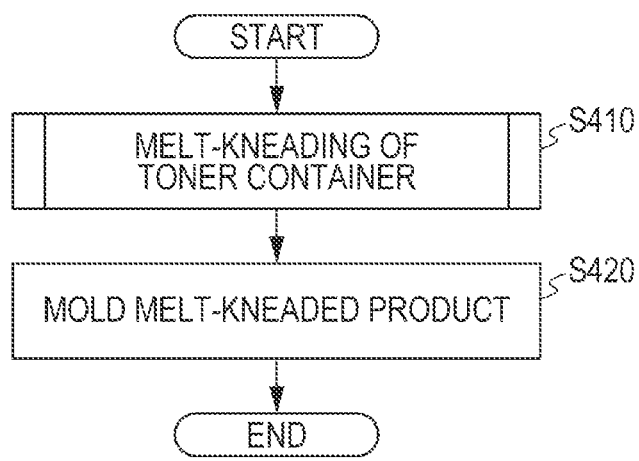
FIG. 6 is a flowchart of a toner container processing method according to an embodiment of the present invention.

FIG. 6 is a flowchart of a toner container processing method according to an embodiment of the present invention.

As illustrated in FIG. 6, a toner container processing method according to the embodiment of the present invention includes: a step of melt-kneading a toner container sorted by the toner container sorting method or a toner container pulverized by the toner container pulverizing method, and molding a melt-kneaded product obtained by the melt-kneading.

4-1. Step of Melt-Kneading Toner Container (Step S410)

In this step, melt-kneading is performed on a toner container sorted by the toner container sorting method or a toner container pulverized by the toner container pulverizing method.

A method of melt-kneading the toner container is not particularly limited, and examples include methods using a single-screw kneader and a twin-screw kneader.

A temperature at which the toner container is melted is not particularly limited, but is usually 150° C. or more and 220° C. or less.

In a case where the toner container sorted by the toner container sorting method is melt-kneaded, the sorted toner container is melt-kneaded by being put into a kneader as it is, or the like. Further, in a case where the toner container pulverized by the toner container pulverizing method is melt-kneaded, the pulverized toner container is melt-kneaded by being put into a kneader, or the like.

Note that, in this step, melt-kneading may be performed using a single-screw kneader, a twin-screw kneader, or the like, or melting and kneading may be performed by separate machines.

Figure 7:
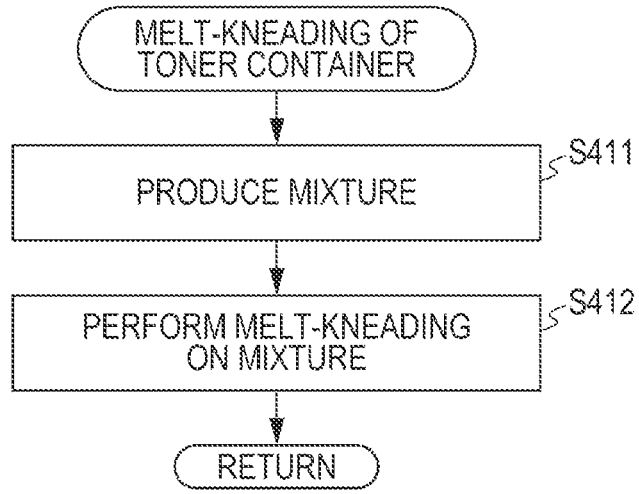
FIG. 7 is a flowchart illustrating details of a step of melt-kneading a toner container in the flowchart of FIG. 6.

As illustrated in FIG. 7, this step may include a step of producing a mixture by adding another resin to the sorted or pulverized toner container, and a step of melt-kneading the produced mixture.

4-1-1. Step of Producing Mixture by Adding Another Resin (Step S411)

In this step, another resin is added to the sorted or pulverized toner container to produce a mixture.

In the present invention, the "another resin" is not particularly limited as long as it is resin compatible with the resin contained in the toner container, but it is preferably the same as the resin contained in the toner container from the viewpoint of enhancing compatibility. In addition, from the viewpoint of improving impact strength of the toner container molded after processing, the recycling frequency of the another resin is preferably smaller than the recycling frequency of the toner container estimated by the toner container information acquiring method, and the recycling frequency of the another resin is more preferably 0.

A mixing ratio of the sorted or pulverized toner container and the another resin in the mixture is changed in accordance with the estimated state of the toner container. Specifically, a content of the another resin with respect to a total mass of the mixture is adjusted to increase as strength of the toner container acquired by the toner container information acquiring method is deteriorated. When the toner container information acquiring method includes a step of estimating the recycling frequency of the toner container, the content of the another resin with respect to the total mass of the mixture is adjusted to increase as the estimated recycling frequency increases. By doing this way, it is possible to determine a minimum amount of the another resin required to ensure the strength required for the toner container obtained by recycling with respect to collected toner containers. Therefore, at the time of recycling, a necessary amount of the another resin can be exclusively added and melt-kneaded, work efficiency can be improved, and a cost of material preparation can also be reduced.

4-1-2. Step of Melt-Kneading Mixture (Step S412)

In this step, a mixture produced in the step of producing the mixture is melt-kneaded.

A method of melt-kneading the mixture is similar to the step of melt-kneading the toner container, and thus a detailed description thereof will be omitted.

4-2. Step of Molding Melt-Kneaded Product (Step S420)

In this step, the melt-kneaded product obtained in the step of melt-kneading the toner container is molded.

A shape of the melt-kneaded product to be molded is not particularly limited, but pelletization is included as an example. The pelletization is performed using a pelletizer or the like. A known pelletizer can be used.

A particle diameter of a pellet is not particularly limited, but is usually 3 mm or more and 6 mm or less, and is preferably 3 mm or more and 5 mm or less from the viewpoint of making the pellet easy to melt.

5. Toner Container Manufacturing Method

Figure 8:
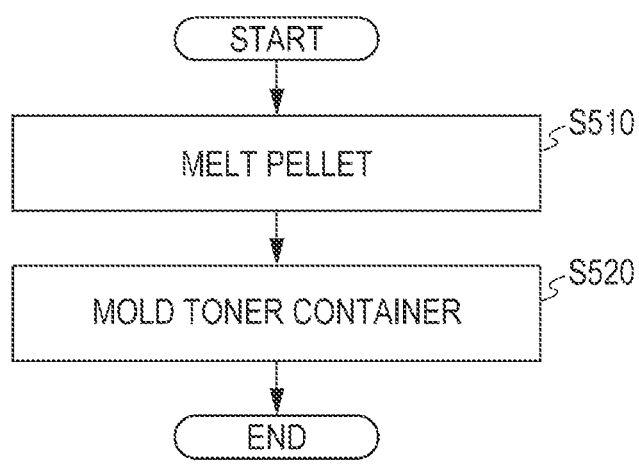
FIG. 8 is a flowchart of a toner container manufacturing method according to an embodiment of the present invention.

FIG. 8 is a flowchart of a toner container manufacturing method according to an embodiment of the present invention.

As illustrated in FIG. 8, the toner container manufacturing method according to the embodiment of the present invention includes a step of melting pellets obtained by the toner container processing method, and a step of molding the melted pellets into a shape of a toner container.

5-1. Step of Melting Pellets (Step S510)

In this step, the pellets obtained by the toner container processing method are melted.

A method of melting the pellets is not particularly limited, and a known method can be used.

A temperature at which the pellets are melted is not particularly limited, but is usually 150° C. or more and 220° C. or less.

5-2. Step of Molding into Shape of Toner Container (Step S520)

In this step, the pellets melted in the step of melting pellets are molded into a shape of a toner container.

A method of molding into a shape of the toner container is not particularly limited, and blow molding and injection molding are included as examples. Blow molding is preferable from the viewpoint of suppressing a cost required for molding.

Note that the toner container information acquiring method, the toner container sorting method, the toner container pulverizing method, the toner container processing method, and the toner container manufacturing method according to the present invention may be performed separately and independently, or may be performed continuously Specific Example <<Experiments 1 to 25>>

Toner was suctioned and removed by the suction machine from a toner container having the recycling frequency of 1 estimated by the toner container information acquiring method, and then the toner container was pulverized into flakes by the pulverizer. A melt-kneaded product of the obtained flakes and a polyethylene resin (hereinafter, referred to as a virgin material) previously pulverized into flakes by the pulverizer and having a recycling frequency of 0 is melt-kneaded by a tin-screw kneader and then extruded, and was processed into pellets to obtain a molding material. Using the obtained molding material, a toner container was molded, and the molded toner container was filled with toner. This operation was similarly performed for toner containers in which the recycling frequency was 2 to 5, a mixing ratio of a recycled toner container (hereinafter, referred to as a recycled material) and the virgin material was adjusted as shown in Tables 3 to 5, and Experiments 1 to 25 were performed.

<Measurement of Impact Strength>

A test piece was separately prepared in a method similar to Experiments 1 to 25, and Charpy impact strength was measured in accordance with a method of JIS K 7111-1. Then, evaluation was performed in accordance with the following criteria, and ◯ and Δ were regarded as acceptable.

◯: Charpy impact strength: 10 kJ/mm$^2$ or more

Δ: Charpy impact strength: 8 kJ/mm$^2$ or more and less than 10 kJ/mm$^2$ x: Charpy impact strength: less than 8 kJ/mm$^2$ <Container Drop Test>

In Experiments 1 to 25, a toner container that had been filled with toner was dropped on concrete from a height of 1 in in a horizontal state, and it was visually confirmed whether there was toner spilling One without toner spilling was evaluated as ◯, while one with toner spilling was evaluated as x.

The results are summarized in Tables 3 to 5.

TABLE 3

|  | Experiment 1 | Experiment 2 | Experiment 3 | Experiment 4 | Experiment 5 | Experiment 6 | Experiment 7 | Experiment 8 | Experiment 9 | Experiment 10 |
|---|---|---|---|---|---|---|---|---|---|---|
| Recycling frequency | 1 | 1 | 1 | 1 | 1 | 2 | 2 | 2 | 2 | 2 |
| Recycled material content [mass %] | 10 | 30 | 50 | 70 | 90 | 10 | 30 | 50 | 70 | 90 |
| Virgin material content [mass %] | 90 | 70 | 50 | 30 | 10 | 90 | 70 | 50 | 30 | 10 |
| Charpy impact strength [kJ/mm$^2$] | 13.1 (o) | 13.3 (o) | 13 (o) | 12.8 (o) | 12.6 (o) | 13 (o) | 12.8 (o) | 12.6 (o) | 11.7 (o) | 9.2 (Δ) |
| Container drop test | o | o | o | o | o | o | o | o | o | o |

TABLE 4

|  | Experiment 11 | Experiment 12 | Experiment 13 | Experiment 14 | Experiment 15 | Experiment 16 | Experiment 17 | Experiment 18 | Experiment 19 | Experiment 20 |
| --- | --- | --- | --- | --- | --- | --- | --- | --- | --- | --- |
| Recycling frequency | 3 | 3 | 3 | 3 | 3 | 4 | 4 | 4 | 4 | 4 |
| Recycled material content [mass %] | 10 | 30 | 50 | 70 | 90 | 10 | 30 | 50 | 70 | 90 |
| Virgin material content [mass %] | 90 | 70 | 50 | 30 | 10 | 90 | 70 | 50 | 30 | 10 |
| Charpy impact strength [kJ/mm$^2$] | 12.9 (o) | 12.4 (o) | 11.8 (o) | 9.6 (Δ) | 4.3 (x) | 13 (o) | 10.4 (o) | 9.4 (Δ) | 8.7 (Δ) | 4.2 (x) |
| Container drop test | o | o | o | o | x | o | o | o | o | x |

TABLE 5

|  | Experiment 21 | Experiment 22 | Experiment 23 | Experiment 24 | Experiment 25 |
| --- | --- | --- | --- | --- | --- |
| Recycling frequency | 5 | 5 | 5 | 5 | 5 |
| Recycled material content [mass %] | 10 | 30 | 50 | 70 | 90 |
| Virgin material content [mass %] | 90 | 70 | 50 | 30 | 10 |
| Charpy impact strength [kJ/mm$^2$] | 13 (o) | 9.7 (Δ) | 8.5 (Δ) | 4.3 (x) | 4 (x) |
| Container drop test | o | o | o | x | x |

Figure 9:
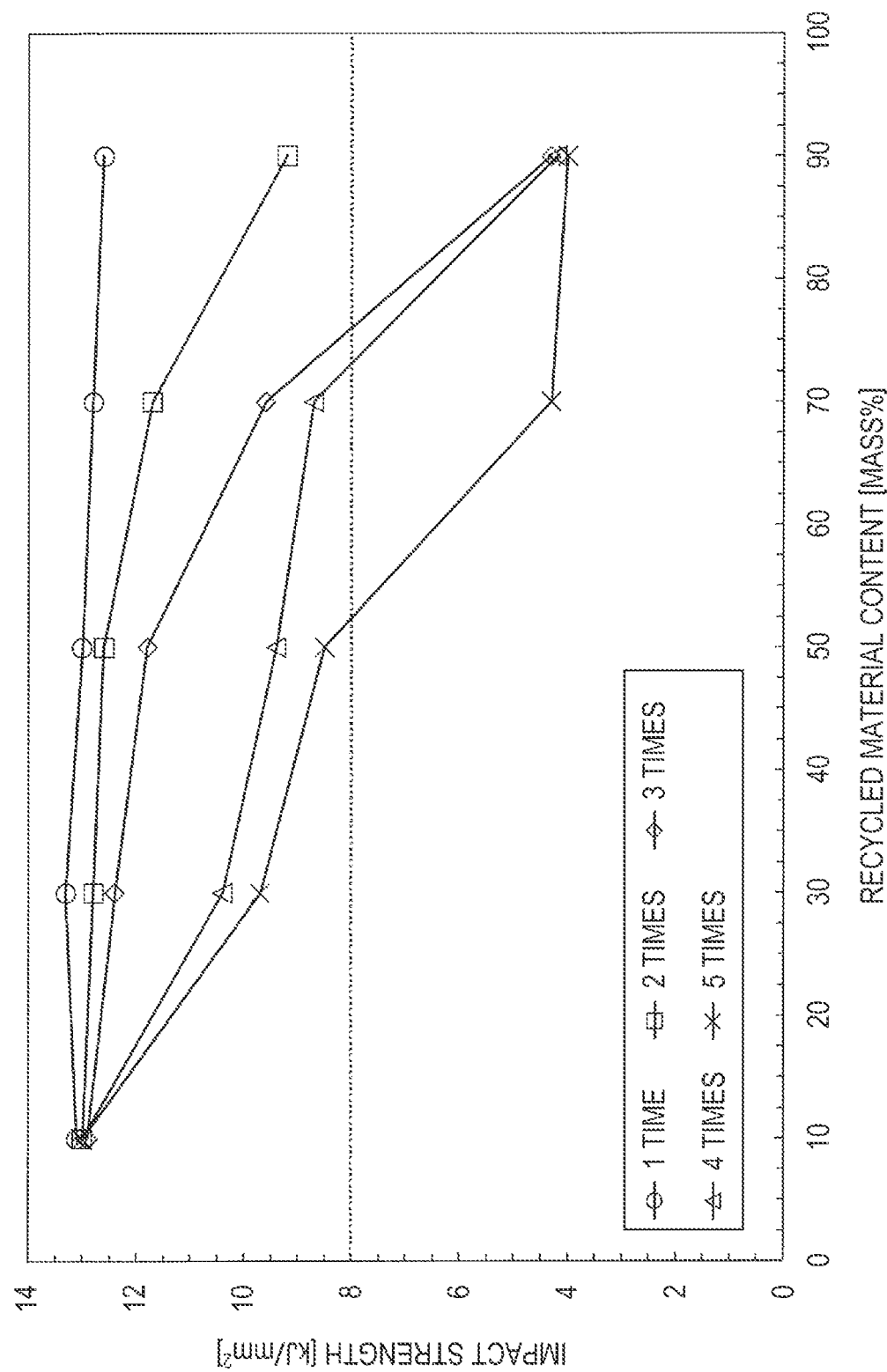
FIG. 9 is a relation view between impact strength and a content of a recycled material, in a specific example of a toner container pulverizing method, a toner container processing method, and a toner container manufacturing method according to an embodiment of the present invention.

From Tables 3 to 5, a relation view (FIG. 9) showing an influence of a content of the recycled material on the impact strength at the recycling frequencies of 1 to 5 was created. In addition, FIG. 10 illustrating a maximum content of the recycled material when the impact strength was 8 kJ/mm$^2$ or more was created.

As described above, by adjusting a mixing ratio of the recycled material and the virgin material in accordance with the estimated recycling frequency, it was possible to suppress deterioration of the toner container even when the recycling frequency was increased.

Figure 10:
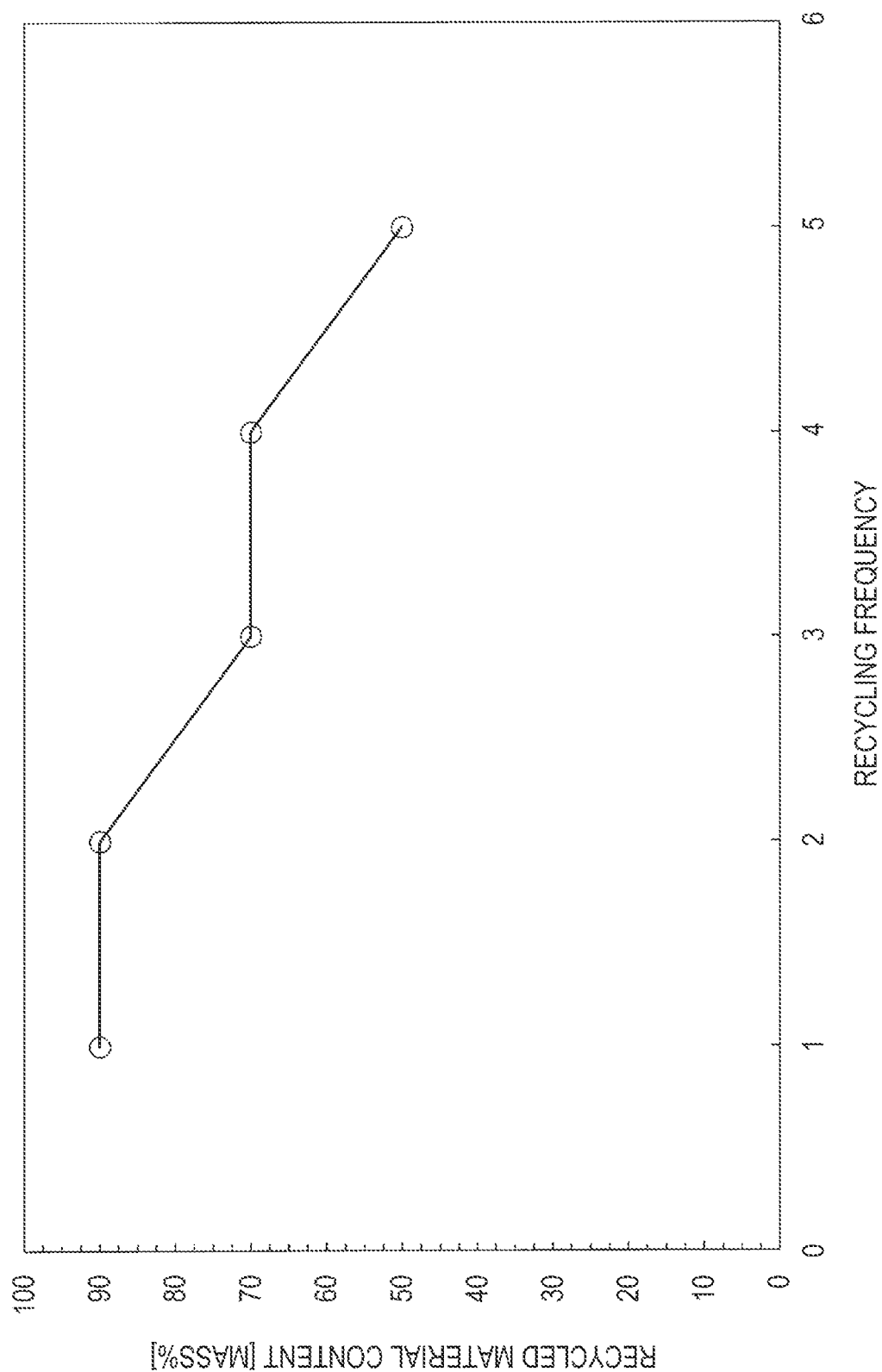
FIG. 10 is a graph illustrating an upper limit value of a content of a recycled material having impact strength of 8 kJ/mm² or more, for each recycling frequency in FIG. 9.

In addition, according to FIG. 10, it was possible to estimate an upper limit of the content of the recycled material for manufacturing a toner container having impact strength of 8 kJ/mm$^2$ or more, which is acceptable, at the estimated recycling frequency. Note that FIG. 10 is applicable even when a value of the estimated recycling frequency is not an integer. For example, when the estimated recycling frequency is 2 or less, the content of the recycled material suffices to be set to 90% or less to be mixed with the virgin material. When the estimated recycling frequency is more than 2 and 4 or less, the content of the recycled material suffices to be set to 70% or less to be mixed with the virgin material.

However, in Experiments 15, 20, 24, and 25, the evaluation was poor in the impact strength and the drop test. In addition, from FIGS. 9 to 10, the upper limit value of the content of the recycled material with respect to the total mass of the mixture of the recycled material and the virgin material was lowered as the recycling frequency was increased. That is, it was found that the content of the virgin material needed to be increased every tune the recycling frequency was increased.

By the toner container information acquiring method, the toner container sorting method, the toner container pulverizing method, the toner container processing method, and the toner container manufacturing method according to the present invention, it becomes possible to estimate a degree of deterioration of a toner container and to suppress deterioration, in recycling the toner container. Therefore, the present invention enables manufacturing of a recycled product of a toner container that is not easily damaged, and is expected to contribute to progress and spread of the technology in the same field.

Although embodiments of the present invention have been described and illustrated in detail, the disclosed embodiments are made for purposes of illustration and example only and not limitation. The scope of the present invention should be interpreted by terms of the appended claims.

What is claimed is:

1. A toner container information acquiring method comprising:
   measuring a toner amount contained in a resin forming a toner container; and
   acquiring information regarding mechanical strength of the toner container based on the measured toner amount.

2. The toner container information acquiring method according to claim 1, wherein the measuring the toner amount is measuring an amount of a toner base particle contained in a resin forming the toner container.

3. The toner container information acquiring method according to claim 1, wherein the measuring the toner amount is measuring an amount of an external additive contained in a resin forming the toner container.

4. The toner container information acquiring method according to claim 1, wherein the toner amount is measured by observing the toner container.

5. The toner container information acquiring method according to claim 1, wherein the toner amount is measured by observing a surface of the toner container.

6. The toner container information acquiring method according to claim 1, wherein the toner amount is measured by elemental analysis.

7. The toner container information acquiring method according to claim 6, wherein the toner amount is measured by X-ray fluorescence analysis.

8. The toner container information acquiring method according to claim 1, wherein the obtaining the information regarding mechanical strength is estimating a recycling frequency of the toner container.

9. The toner container information acquiring method according to claim 1, wherein the toner container contains a polyolefin resin or a polystyrene resin.

10. A toner container sorting method comprising:
acquiring information on a toner container by the toner container information acquiring method according to claim 1; and
sorting the toner container in accordance with the acquired information on the toner container.

11. The toner container sorting method according to claim 10, wherein the sorting the toner container is selecting the toner container to be recycled and the toner container not to be recycled.

12. A toner container pulverizing method comprising:
pulverizing
a toner container sorted by the toner container sorting method according to claim 10.

13. A toner container processing method comprising:
melt-kneading a toner container sorted by the toner container sorting method according to claim 10; and
molding a melt-kneaded product obtained by the melt-kneading.

14. The toner container processing method according to claim 13, wherein
the melt-kneading includes:
producing a mixture by adding another resin to the sorted or pulverized toner container; and
melt-kneading the mixture, and
in the producing the mixture, a content of the another resin with respect to a total mass of the obtained mixture is changed in accordance with the acquired information on the toner container.

15. The toner container processing method according to claim 13, wherein the molding is pelletizing the melt-kneaded product.

16. A toner container manufacturing method comprising:
melting a pellet obtained by the toner container processing method according to claim 15; and
molding the melted pellet into a toner container.

17. A toner container processing method comprising:
melt-kneading a toner container pulverized by the toner container pulverizing method according to claim 12; and
molding a melt-kneaded product obtained by the melt-kneading.

* * * * *